United States Patent [19]
Perret et al.

[11] Patent Number: 5,965,668
[45] Date of Patent: Oct. 12, 1999

[54] POLYAMIDE INJECTION MOULDINGS WHICH INCLUDE AN IMPACT STRENGTH MODIFIER THAT HAS A PARTICULAR DISTRIBUTION IN THE POLYAMIDE

[75] Inventors: Patrice Perret, Puteaux; Alain Bouilloux, Bernay, both of France

[73] Assignee: Elf Atochem S.A., France

[21] Appl. No.: 08/843,591

[22] Filed: Apr. 16, 1997

[30] Foreign Application Priority Data

Apr. 16, 1996 [FR] France ................................. 96 04719

[51] Int. Cl.⁶ .......................... C08L 77/00; C08F 37/16
[52] U.S. Cl. .................... 525/182; 523/206; 524/514; 525/426
[58] Field of Search ........................ 525/182, 426; 524/514; 523/206

[56] References Cited

U.S. PATENT DOCUMENTS

| | | | |
|---|---|---|---|
| 4,174,358 | 11/1979 | Epstein | 525/483 |
| 4,847,330 | 7/1989 | Plachetta et al. | 525/182 |
| 5,070,145 | 12/1991 | Guerdoux | 525/179 |
| 5,112,908 | 5/1992 | Epstein | 525/182 |
| 5,708,088 | 1/1998 | Hert et al. | 525/183 |

FOREIGN PATENT DOCUMENTS

| | | |
|---|---|---|
| 002761 | 7/1979 | European Pat. Off. . |
| 052796 | 6/1982 | European Pat. Off. . |
| 096264 | 12/1983 | European Pat. Off. . |
| 0 564 338 | 10/1993 | European Pat. Off. . |
| 2292016 | 11/1975 | France . |
| 1241361 | 8/1971 | United Kingdom ........ 525/182 |
| WO 91 07467 | 5/1991 | WIPO . |

OTHER PUBLICATIONS

European Search Report dated Jun. 16, 1997.
French Search Report dated Dec. 17, 1996.

*Primary Examiner*—Andrew E. C. Merriam
*Attorney, Agent, or Firm*—Bell, Boyd & Lloyd

[57] ABSTRACT

The invention relates to impact-resistant injection mouldings based on polyamide resin (A) and on a disperse phase whose particles have a number-average diameter greater than 0.4 μm, a volume-average diameter greater than 1 μm and such that more than 50% by volume of the particles are larger than 1 μm The disperse phase may consist of a mixture including at least one copolymer (B) of ethylene and of an unsaturated epoxide and of at least one polyolefin (C).

11 Claims, No Drawings

POLYAMIDE INJECTION MOULDINGS WHICH INCLUDE AN IMPACT STRENGTH MODIFIER THAT HAS A PARTICULAR DISTRIBUTION IN THE POLYAMIDE

FIELD OF THE INVENTION

The present invention relates to polyamide injection mouldings which include an impact strength modifier that has a particular distribution in the polyamide.

BACKGROUND OF THE INVENTION

The improvement in the impact strength of polyamides is generally obtained by incorporating in the form of a disperse phase an impact strength modifier which is elastomeric in nature and has reactive functional groups (acrylic acid, maleic anhydride, etc.) capable of reacting with functional groups of the polyamide matrix. This reactivity makes it possible to ensure a fine and homogeneous dispersion of the elastomer, and a good adhesion at the matrix nodule interface, but results in a considerable drop in fluidity. This large change in the viscosity is detrimental to the processing, especially in the case of thin or large-sized injection mouldings.

DESCRIPTION OF THE INVENTION

The applicant company has discovered that by employing compositions based on polyamide resin (A) and on a disperse phase whose particles have a number-average diameter greater than 0.4 $\mu$m, a volume-average diameter greater than 1 $\mu$m and such that more than 50% by volume of the particles are larger than 1 $\mu$m, it is possible to obtain a good impact strength and a good fluidity at the same time. The disperse phase may consist, for example, of a mixture of at least one copolymer (B) of ethylene and of a saturated epoxide and of at least one polyolefin (C). Applicant has also discovered that a good impact strength is obtained in this way, a good fluidity being maintained, while employing little reactive copolymer (B).

The prior art has already described impact-resistant compositions based on polyamide.

EP 96 264 describes polyamides with a viscosity of between 2.5 and 5, reinforced with ethylene/$C_2$–$C_8$ alkyl (meth)acrylate/unsaturated acid or anhydride copolymers and including 20 to 40% by weight of acrylate.

EP 2 761 describes polyamides reinforced with polyethylenes or ethylene copolymers grafted with (meth)acrylic acid, its derivatives or maleic anhydride and optionally polyethylene.

EP 52 796 describes polyamides reinforced with (i) an alpha-olefin/unsaturated carboxylic acid copolymer, (ii) an alpha-olefin unsaturated carboxylic acid alkyl ester copolymer and (iii) a metal compound.

FR 2 292 016 describes polyamides reinforced with a mixture of copolymers of alpha-olefins and of unsaturated carboxylic acid esters or their derivatives.

U.S. Pat. No. 5,070,145 describes polyamides reinforced with a mixture (i) of a polyethylene or of an ethylene/alkyl (meth)acrylate copolymer and (ii) of an ethylene/alkyl (meth)acrylate/maleic anhydride copolymer.

This prior art has exemplified only compositions in which the impact strength improver is based on polymers containing acidic or acid anhydride functional groups. No mention is made of the particle distribution or of the viscosity.

WO 91/07467 describes polyamides-6 reinforced with amorphous or semicrystalline polyolefins in which the polyolefins are in the form of particles of number-average diameter between 0.2 and 1 $\mu$m and such that 25 to 50% by volume of the particles have a mean diameter greater than 1 $\mu$m. This application relates essentially to EPRs which are of high viscosity, as polyolefins.

U.S. Pat. No. 4,174,358 describes reinforced polyamides which are in the form of a polyamide matrix in which are dispersed nodules smaller than 1 $\mu$m which have a certain modulus that must also be a fraction of the modulus of the polyamide. Very numerous reinforcing agents are described, some having epoxide functional groups. The majority are polymers which have neutralized acidic or anhydride functional groups or are mixtures based on EPDM. The polymers containing epoxide functional groups are not exemplified. All these reinforcing agents are presented as being equivalent.

All this prior art has exemplified only reinforcing agents that have acidic or acid anhydride functional groups or EPDMs and no mention is made of the viscosity of the reinforced polyamides.

EP 564 338 describes polyamides reinforced (i) with ethylene/alkyl (meth)acrylate/glycidyl methacrylate copolymers and (ii) optionally with polyethylenes, ethylene/alkyl (meth)acrylate copolymers or ethylene/alkyl (meth)acrylate/unsaturated dicarboxylic acid anhydride copolymers. This prior art is concerned only with the impact strength and not with the viscosity. According to the table of the examples (Example 6) it is clear that it is advantageous to mix a reinforcing agent which has epoxide functional groups with a reinforcing agent which has anhydride functional groups in order to bring about a crosslinking of the disperse phase, and this gives remarkable impact strengths but is detrimental to the viscosity. The tests were done on injection-moulded test pieces 4×10 ×80 $mm^3$ in size.

It is clear that with such size and in laboratory conditions the viscosity is of no importance.

The situation is completely different in the case of thin or larger-sized articles or else those of complicated shape, where these articles have to be produced at industrial rates.

The advantage of the compositions of the invention is the compromise between the impact strength and the viscosity. Another advantage is that it is sufficient to add the impact strength improver, that is to say the material which will constitute the disperse phase, into the extruder which feeds the injection-moulding equipment. This addition can be performed by a side extruder or a granulate-metering device on the polyamide extruder. It is therefore not necessary to prepare the mixture of the polyamide resin and of the impact strength improver in advance.

The present invention therefore relates to injection mouldings based on polyamide resin (A) and on a disperse phase whose particles have a number-average diameter greater than 0.4 $\mu$m, a volume-average diameter greater than 1 $\mu$m and such that more than 50% by volume of the particles are larger than 1 $\mu$m.

Some of the compositions employed for these injection mouldings are new and the invention also relates to these compositions.

Polyamide is intended to mean the products of condensation:

of one or more amino acids, such as aminocaproic, 7-aminoheptanoic, 11-aminoundecanoic and 12-aminododecanoic acids or of one or more lactams such as caprolactam, oenantholactam and lauryllactam, of one or more salts or mixtures of diamines such as hexamethylenediamine, dodecamethylenediamine, meta-xylylenediamine, bis-p-aminocyclohexylmethane and trimethylhexamethylenediamine with diacids such as isophthalic, terephthalic, adipic, azelaic, suberic, sebacic and dodecanedicarboxylic acids, or of mixtures of some of these monomers, which results in copolyamides.

For example, the condensation of caprolactam and of lauryllactam produces PA-6/12. The invention advantageously relates to PA-6 (polycaprolactam), PA-6,6 (polyhexamethylene adipamide), PA-11 (polyaminoundecanoic acid), PA-12 (polylauryllactam) and PA-6/12. It is more particularly useful for PA-6 and PA-6,6 polymers.

The quantity of this disperse phase may vary within wide limits depending on the properties required of the reinforced polyamide resin. Quantities of up to 25%, and advantageously between 10 and 20%, by weight of the combination of the polyamide resin (A) and of the disperse phase are, however, sufficient.

Although the disperse phase may consist of many types of polymers, Applicant has found that it is advantageous for the disperse phase to consist of a mixture including at least one copolymer (B) of ethylene and of an unsaturated epoxide and of at least one polyolefin (C).

The copolymer (B) of ethylene and of an unsaturated epoxide can be obtained by copolymerization of ethylene and of an unsaturated epoxide or by grafting the unsaturated epoxide onto polyethylene. The grafting may be performed in a solvent phase or on the molten polyethylene in the presence of a peroxide. These grafting techniques are known per se. As for the copolymerization of ethylene and of an unsaturated epoxide, so-called radical polymerization processes which usually operate at pressures of between 200 and 2500 bars can be employed.

Examples of unsaturated epoxides which may be mentioned are:

aliphatic glycidyl esters and ethers such as allyl glycidyl ether, vinyl glycidyl ether, glycidyl maleate and itaconate, glycidyl (meth)acrylate, and alicyclic glycidyl esters and ethers such as 2-cyclohex-1-ene glycidyl ether, diglycidyl 4,5-cyclohexenecarboxylate, glycidyl 4-cyclohexenecarboxylate, glycidyl 5-norbornene-2-methyl-2-carboxylate and diglycidyl endocisbicyclo [2.2.1]-5-heptene-2,3-dicarboxylate.

The copolymer of ethylene and of unsaturated epoxide may also include other monomers which can be chosen, for example, from:

alpha-olefins such as propylene, 1-butene, hexene, etc.;

vinyl esters of saturated carboxylic acids such as vinyl acetate or vinyl propionate;

esters of unsaturated carboxylic acids such as alkyl (meth) acrylates which may contain up to 24 carbons.

To give an example, the unsaturated epoxide may be grafted onto the following polymers:

polyethylene, copolymers of ethylene and of an alpha-olefin, polyethylenes such as LDPE (low density PE), HDPE (high density PE), LLDPE (linear low density PE), VLDPE (very low density PE) or metallocene PE;

the copolymers of ethylene and of at least one vinyl ester of a saturated carboxylic acid, such as vinyl acetate or vinyl propionate;

copolymers of ethylene and of at least one ester of an unsaturated carboxylic acid, such as alkyl (meth) acrylates which may have up to 24 carbons;

EPR (ethylene/propylene rubber) or EPDM (ethylene/propylene/diene) elastomers;

mixtures of polymers chosen from those above.

Examples of polyolefin (C) which may be mentioned are the same polymers as above, that is to say those onto which the unsaturated epoxide is grafted to obtain (B). Advantageously (C) is not highly or not crystalline and preferably is of an elastomeric nature.

Applicant has discovered that a good impact strength is obtained by maintaining a good fluidity whereas in the impact strength modifier consisting of the mixture of (B) and (C) only (B) has functional groups.

Applicant has discovered that at identical impact strength modifier content, that is to say with the same proportion of (B)+(C) in the polyamide (A) and with the same quality of (B) and (C), the best fluidity impact compromise is obtained with (C)/(B) proportions of approximately 90/10 by weight, that is to say that on increasing the proportion of (B) such that (C)/(B) varies from 95/5 to 80/20, it is found that from 90/10 to 80/20 the gain in the impact is small; it is even negative in the case of PA-6, whereas the melt index decreases strongly.

Applicant has also discovered that, with the same (B)/(C) ratio, if the proportion of the mixture of (B)+(C) in the polyamide (A) is increased then the melt index decreases while the impact strength at −40° C. is not substantially improved. Thus, if (B)+(C) varies from 10 parts per 90 parts of polyamide (A) to 20 parts per 80 parts of (A) the melt index is reduced by approximately 40% whereas the gain in the impact is from 15 to 20%. Advantageously therefore (B)+(C) is between approximately 10 and 15% of (A)+(B)+(C). Such compositions are new.

The quantity of epoxide in the copolymer (B) may vary and may be up to 10%, advantageously from 0.1 to 8%, by weight of (B).

The present invention also relates to the impact-resistant polyamide resin compositions including a polyamide (A) and a disperse phase whose particles have a number-average diameter greater than 0.4 $\mu$m, a volume-average diameter greater than 1 $\mu$m, such that more than 50% by volume of the particles are larger than 1 $\mu$m, the quantity of disperse phase being such that their melt index is higher than 30% of the melt index of (A) alone.

The disperse phase advantageously consists of a mixture of at least one copolymer (B) of ethylene and of an unsaturated epoxide and of at least one polyolefin (C).

(B) and (C) have been defined above, as has the proportion of (B) in relation to (C).

The quantity of (B)+(C), that is to say of the disperse phase, is advantageously between 10 and 15% by weight of (A)+(B)+(C).

The copolymer (B) of the injection mouldings of the invention and of the impact-resistant polyamide resin compositions mentioned above is advantageously an ethylene/alkyl (meth)acrylate/unsaturated epoxide copolymer.

It may advantageously contain up to 40% by weight of alkyl (meth)acrylate and up to 10%, preferably 0.1 to 8%, by weight of unsaturated epoxide.

The epoxide is advantageously glycidyl (meth)acrylate.

The alkyl (meth)acrylate is advantageously chosen from methyl (meth)acrylate, ethyl acrylate, n-butyl acrylate, isobutyl acrylate and 2-ethylhexyl acrylate.

The quantity of alkyl (meth)acrylate is advantageously from 20 to 35%.

This copolymer can be obtained by radical polymerization of the monomers.

The polyolefin (C) of the injection mouldings of the invention and the impact-resistant polyamide resin compositions mentioned above is advantageously a copolymer of ethylene and of an alkyl (meth)acrylate. The alkyl (meth) acrylates may be chosen from those already mentioned in the case of (B). (C) may contain up to 40%, and preferably from 20 to 35%, by weight of (meth)acrylate.

(B) and (C) are preferably ethylene/alkyl (meth)acrylate/ glycidyl (meth)acrylate and ethylene/alkyl (meth)acrylate copolymers respectively.

These copolymers (B) and (C) can be obtained by radical polymerization of the monomers.

It would not constitute a departure from the scope of the invention to add inorganic fillers (talc, $CaCO_3$, kaolin etc.), reinforcements (glass fibre, inorganic fibre, carbon fibre, etc.), stabilizers (heat, UV), flame retardants and colourants.

The compositions of the invention are prepared by the usual technology for thermoplastics, such as extrusion, twin-screw mixers or the like.

The present invention also relates to the mixture of (B) and (C) and its use as impact strength modifier for polyamides (A).

EXAMPLES

Precompounding of the Mixture (C)/(B)

Compounding on a single-screw Fairex or Kaufmann, on a Buss PR 46 co-kneader or on a Werner 40 L/D 40 twin-screw extruder according to the examples with a temperature profile of 120/140/160/160° C.

Compounding of the Impact-Modified PA Compositions

Compounding on a Werner 40 L/D 40 twin-screw extruder fitted with a degassing system and a lace cutter, with a flow rate of 40 kg/h and a speed of 150 revolutions/ min.

The temperature profiles employed are the following:

PA 6 base: 240/240/240/240° C.

PA 6 6 base: 260/265/265/266° C.

The components in granulate form are mixed dry and then introduced into the feed hopper.

Moulding of the Samples

The granules are dried under reduced pressure at a temperature of 80° C. and are then injection-moulded on a Krauss Maffei B1 type injection moulding press (60 t blocking) in the following conditions:

PA 6 base composition

Stock temperature 240–260° C., mould 50° C.

Injection pressure 45 bars

PA 6 6 base composition

Stock temperature 260–280° C., mould 80° C.

Injection pressure 70 bars.

The standardized test pieces (80×10×4 $mm^3$) thus obtained are conditioned for 14 days at 23° C. and 50% relative humidity.

Evaluation

Flexural modulus according to ISO Standard 178

Impact strength on prenotched test pieces of the Charpy type according to ISO Standard 179-82 and of the Izod type according to ISO Standard 180, at various temperatures (23° C., −20° C., −40° C.).

When the crack runs for less than 90% of the thickness at the bottom of the notch in the test piece, no value can be determined and the reference N.B. (no break) is recorded.

Melt index MFI according to ISO Standard 1133 under a weight of 2.16 kg and at temperatures of 235° C. and 275° C. for compositions based on PA 6 and PA 6 6 respectively.

The determination of the diameter of the disperse phase in the polyamide matrix is carried out in 5 stages:

A microtome section of the surface with the aid of a glass knife is produced in order to have a planar surface. This operation is performed at low temperature (~−60° C.) with a Microm HM 350 microtome.

The disperse phase is extracted from the matrix with a selective solvent of the xylene type at 50° C. for 30 min. The sample is then vacuum-dried.

The sample is then vacuum-metallized with a thin layer of gold (~20 nm) with an item of equipment of Edwards S 150 A type.

The sample is inspected with the aid of a Philips SEM 505 scanning electron microscope with an acceleration voltage of 15 kV. The magnification is selected so as to allow 500 particles per plate to be observed.

A semiautomatic method is employed for quantifying the particle size and the distribution of the disperse phase with a Kontron IBAS 2000 image analyser. After obtaining a binary image, the area of each dispersed particle is measured. The diameter of the equivalent circle of the particle is then determined for each particle. A distribution histogram, the number-average diameter ø n, the volume-average diameter ø v and the polydispersity index Ip can be calculated in the following manner:

$$\varnothing n = \frac{\sum nidi}{\sum ni}$$

$$\varnothing v = \frac{\sum nidi^4}{\sum nidi^3}$$

$$Ip = \frac{\varnothing v}{\varnothing n}$$

where ni is the number of particles of diameter di.

By virtue of the histogram the percentage of particles which have a diameter ø n and/or ø v greater than a given value can be determined.

Raw Materials

The polyamides tested are polyamide 6 and 6 6 marketed by BASF under references Ultramid B 3 and A 3 respectively.

The polymers tested are:

TERPO 1 E/EA/MAH terpolymer 68.5/30/1.5% by weight, MFI 7

TERPO 2 E/EA/MAH terpolymer 64.1/35/0.9% by weight, MFI 7

TERPO 3 E/EA/GMA terpolymer 68/24/8% by weight, MFI 6

TERPO 4 E/MA/GMA terpolymer 68/24/8% by weight, MFI 6

The copolymers (C) tested are:

COPO 1 E/BA copolymer 70/30% by weight, MFI 7

COPO 2 E/BA copolymer 65/35% by weight, MFI 40 with the following abbreviations:

| | |
|---|---|
| E | Ethylene |
| AE | Acrylic ester |
| MA | Methyl acrylate |
| EA | Ethyl acrylate |
| BA | Butyl acrylate |
| MAH | Maleic anhydride |
| GMA | Glycidyl methacrylate |
| MFI | Melt index (190° C., 2.16 kg) |
| F | Fairex single-screw |
| B | Buss PR 46 kneader |
| W | Werner 40 |
| K | Kaufmann single-screw |

The results of the examples are reported in Tables 1 and 2 which follow

Table 1=PA 6
Table 2=PA 6,6.

EXAMPLES 1-2-3 AND 25-26-27 (COMPARATIVE)

Composition PA 6 or PA 6 6/Terpolymer Containing MAH or GMA Functional Group

Whatever the nature of the reactive group (MAH or GMA), the use of a terpolymer alone as impact strength modifier produces good impact strengths but a low fluidity and a very fine disperse phase.

EXAMPLES 4 AND 28 (COMPARATIVE)

Composition PA 6 or PA 6 6/Mixture (65% copo+35% terpo–MAH)

The copo/MAH terpo mixture is produced beforehand on a Fairex single-screw and then introduced by dry mixing with the PA into a Werner 40 twin-screw. These compositions exhibit impact strength which are similar to Examples 1-2-3 and 25-26-27 with a fluidity which is slightly improved but not sufficiently to allow easy processing by injection moulding.

EXAMPLES 5-6 AND 29

Composition PA 6 or PA 6 6/Mixture (90/10 copo/GMA terpo)

The COPO 1/TERPO 3 90/10 mixture is produced directly by dry mixing with the PA (Ex. 5) or beforehand by compounding on a Buss co-kneader (Ex. 6–29). Despite a low content of reactive polyolefin, satisfactory impact strengths are obtained but with a markedly higher fluidity being retained. In addition, the dispersion, which is less fine, has a large proportion of particles larger than 1 $\mu$m.

EXAMPLES 7-8-9 AND 30-31-32

Composition PA 6 or PA 6 6/Mixture (copo/GMA terpo)

Influence of the copo/terpo ratio

The copo/terpo mixture is produced beforehand on a Werner 40 twin-screw. When the proportion of GMA terpo decreases, the impact strengths are reduced overall but the fluidity is markedly improved. An optimum in the impact strength/fluidity compromise is obtained with a 90/10 copo/GMA terpo ratio. In addition, the dispersion is characterized by larger mean nodule diameters and a higher % of particles larger than 1 $\mu$m.

EXAMPLES 10-11 AND 33-34

Composition PA 6 or PA 6 6/Mixture (90/10 copo/GMA terpo)

Influence of the nature of the copo

The copo/terpo mixture is produced beforehand on a Fairex single-screw.

These tests demonstrate that the COPO must exhibit an elastomeric character and a good compatibility with the terpolymer in order to obtain a good impact strength/fluidity compromise. Polyethylenes of high crystallinity must thus be avoided.

EXAMPLES 12-13-14-15 AND 35-36-37-38

Composition PA 6 or PA 6 6/Mixture (90/10 copo/GMA terpo)

Influence of the precompounding process

The copo/GMA terpo mixtures are produced on various equipment of the Fairex single-screw, Kaufmann, Buss co-kneader or Werner 40 twin-screw type. The previous copo/terpo mixture can be produced on various equipment without detriment either to the mechanical properties or to the fluidity and without substantially influencing the morphology of the final compositions.

EXAMPLES 16-17-18-19-20-21 AND 39-40-41-42-43-44 (comparative)

Composition PA 6 or PA 6 6/MAH Terpo or GMA Terpo

Influence of the modifier content

The PA/terpolymer compositions are produced on a Werner 40 twin-screw.

When the modifier content increases, the impact strengths are improved, to the detriment of the fluidity.

EXAMPLES 22-23-24 AND 45-46-47

Composition PA 6 or PA 6 6/Mixture (90/10 copo/GMA Terpo)

Influence of the modifier content

The copo/terpo mixtures are produced beforehand on a Fairex single-screw, followed by the incorporation into the polyamide resin on a Werner 40 twin-screw.

When the overall content of the copo/GMA terpo mixture increases, the impact strengths are substantially improved but, above all, the change in the fluidity is clearly lower than that observed in Tests 16 to 21 and 39 to 44. In addition, whatever the modifier content, it must be noted that the characteristic morphology of the invention is preserved.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

TABLE 1

| Example | Formulation | Notched Izod (kJ/m$^2$) T 23° C. | Notched Izod (kJ/m$^2$) T −20° C. | Notched Izod (kJ/m$^2$) T −40° C. | Notched Cherry (kJ/m$^2$) T 23° C. | Notched Cherry (kJ/m$^2$) T −20° C. | Notched Cherry (kJ/m$^2$) T −40° C. | Flex. Mod. (MPa) | MFI dg/min | $\phi$ n $\mu$m | $\phi$ v $\mu$m | Ip | Num. % >1 $\mu$m | Vol. % >1 $\mu$m |
|---|---|---|---|---|---|---|---|---|---|---|---|---|---|---|
|  | PA6 | 8 | 6 | 6 | 17 | 11 | 5.7 | 1974 | 21 |  |  |  |  |  |
| 1 | 80% PA6 + 20% TERPO1 | NB | 14 | 9 | NB | 24 | 20 | 1281 | 5.1 | 0.19 | 0.23 | 1.21 | 0 | 0 |
| 2 | 80% PA6 + 20% TERPO2 | NB | 11 | 8 | NB | 21 | 17 | 1192 | 5.4 | 0.15 | 0.25 | 1.67 | 0 | 0 |
| 3 | 80% PA6 + 20% TERPO3 | NB | 17 | 13 | 38 | 30 | 25 | 989 | 6.4 | 0.39 | 0.60 | 1.55 | 0 | 0 |
| 4 | 13% COPO1 + 7% TERPO1 + 80% PA6 |  |  |  | NB | 24 | 22 | 977 | 5.7 | 0.20 | 1.59 | 7.90 | 1 | 68 |
| 5 | 18% COPO1 + 2% |  |  |  | 40 | 28 | 21 | 937 | 8.8 | 0.62 | 1.23 | 1.99 | 9 | 59 |

TABLE 1-continued

| Example | Formulation | Notched Izod (kJ/m²) T 23° C. | Notched Izod (kJ/m²) T -20° C. | Notched Izod (kJ/m²) T -40° C. | Notched Cherry (kJ/m²) T 23° C. | Notched Cherry (kJ/m²) T -20° C. | Notched Cherry (kJ/m²) T -40° C. | Flex. Mod. (MPa) | MFI dg/min | φ n μm | φ v μm | Ip | Num. % >1 μm | Vol. % >1 μm |
|---|---|---|---|---|---|---|---|---|---|---|---|---|---|---|
| 6 | TERPO3 + 80% PA6 20% B (90% COPO1 + 10% TERPO3) + 80% PA6 | | | | 45 | 36 | 32 | 1127 | 7.5 | 0.42 | 0.97 | 2.30 | 6 | 50 |
| 7 | 20% W (95% COPO1 + 5% TERPO3) + 80% PA6 | | | | 24 | 15 | 14 | 1074 | 13 | 0.81 | 2.54 | 3.14 | 22 | 93 |
| 8 | 20% W (90% COPO1 + 10% TERPO3) + 80% PA6 | | | | 58 | 34 | 21 | 920 | 9.7 | 0.71 | 1.66 | 2.33 | 17 | 79 |
| 9 | 20% W (80% COPO1 + 20% TERPO3) + 80% PA6 | | | | 55 | 25 | 18 | 910 | 7.6 | 0.63 | 1.18 | 1.86 | 15 | 56 |
| 10 | 20% F (90% COPO2 + 10% TERPO4) + 80% PA6 | 20 | 8.8 | 5.1 | 33 | 19 | 11 | 850 | 16.8 | 1.64 | 2.97 | 1.81 | 72 | 99 |
| 11 | 20% F (90% LDPE + 10% TERPO4) + 80% PA6 | 8.6 | 4.1 | 3.2 | 19 | 9.2 | 7.8 | 1069 | 9.4 | 1.68 | 3.50 | 2.08 | 62 | 99 |
| 12 | 20% F (90% COPO1 + 10% TERPO3) + 80% PA6 | | | | 54 | 26 | 17 | 866 | 7.9 | 0.65 | 1.34 | 2.07 | 16 | 73 |
| 13 | 20% K (90% COPO1 + 10% TERPO3) + 80% PA6 | | | | 56 | 25 | 21 | 831 | 9.1 | 0.66 | 1.26 | 1.89 | 17 | 72 |
| 14 | 20% B (90% COPO1 + 10% TERPO3) + 80% PA6 | | | | 55 | 25 | 18 | 909 | 7.6 | 0.63 | 1.18 | 1.86 | 15 | 56 |
| 15 | 20% W (90% COPO1 + 10% TERPO3) + 80% PA6 | | | | 58 | 34 | 21 | 700 | 9.7 | 0.71 | 1.66 | 2.33 | 17 | 79 |
| 16 | 90% PA6 + 10% TERPO2 | 17 | 7 | 5 | 21 | 17 | 15 | 1733 | 9.5 | 0.12 | 0.15 | 1.19 | 0 | 0 |
| 17 | 85% PA6 + 15% TERPO2 | 18 | 9 | 6 | 22 | 17 | 16 | 1496 | 6.3 | 0.10 | 0.14 | 1.34 | 0 | 0 |
| 18 | 80% PA6 + 20% TERPO2 | NB | 11 | 8 | NB | 21 | 17 | 1192 | 5.4 | 0.15 | 0.25 | 1.67 | 0 | 0 |
| 19 | 90% PA6 + 10% TERPO3 | 28 | 15 | 10 | 31 | 27 | 18 | 1304 | 13 | 0.31 | 0.47 | 1.51 | 0 | 0 |
| 20 | 85% PA6 + 15% TERPO3 | NB | 17 | 12 | 35 | 32 | 23 | 1147 | 9.5 | 0.29 | 0.43 | 1.49 | 0 | 0 |
| 21 | 80% PA6 + 20% TERPO3 | NB | 17 | 13 | 38 | 30 | 25 | 989 | 6.4 | 0.39 | 0.60 | 1.55 | 0 | 0 |
| 22 | 10% F (90% COPO1 + 10% TERPO4) + 90% PA6 | 14 | 7.8 | 6.5 | 26 | 20 | 17 | 1082 | 15.3 | 1.53 | 3.20 | 2.10 | 63 | 98 |
| 23 | 15% F (90% COPO1 + 10% TERPO4) + 85% PA6 | 16 | 8.5 | 6.5 | 30 | 21 | 19 | 947 | 12.5 | 1.40 | 6.30 | 4.50 | 48 | 98 |
| 24 | 20% F (90% COPO1 + 10% TERPO4) + 80% PA6 | 20 | 9.6 | 7.6 | 40 | 24 | 21 | 803 | 9.4 | 1.25 | 2.63 | 2.11 | 51 | 96 |

TABLE 2

| Example | PA66 + 20% MODIFIER | Notched Izod (kJ/m²) T 23° C. | Notched Izod (kJ/m²) T -20° C. | Notched Izod (kJ/m²) T -40° C. | Notched Cherry (kJ/m²) T 23° C. | Notched Cherry (kJ/m²) T -20° C. | Notched Cherry (kJ/m²) T -40° C. | Flex. Mod. (MPa) | MFI dg/min | φ n μm | φ v μm | Ip | Num. % >1 μm | Vol. % >1 μm |
|---|---|---|---|---|---|---|---|---|---|---|---|---|---|---|
|  | PA66 | | | | 16 | 10 | 4.3 | 2592 | 49 | | | | | |
| 25 | 80% PA66 + 20% TERPO1 | NB | 16 | 12 | 35 | 31 | 27 | 1391 | 3.8 | 0.21 | 0.4 | 1.9 | 0 | 0 |
| 26 | 80% PA66 + 20% TERPO2 | NB | 18 | 12 | 35 | 37 | 29 | 1512 | 4.5 | 0.19 | 0.30 | 1.53 | 0 | 0 |
| 27 | 80% PA66 + 20% TERPO3 | 21 | 12 | 9 | 30 | 26 | 25 | 1460 | 15 | 0.45 | 0.87 | 1.91 | 0 | 0 |
| 28 | 20% F (65% COPO1 + 35% TERPO1) + | | | | 36 | 28 | 25 | 1319 | 7.2 | 0.26 | 0.43 | 1.68 | 0 | 0 |

TABLE 2-continued

| Example | PA66 + 20% MODIFIER | Notched Izod (kJ/m²) T 23° C. | Notched Izod (kJ/m²) T -20° C. | Notched Izod (kJ/m²) T -40° C. | Notched Cherry (kJ/m²) T 23° C. | Notched Cherry (kJ/m²) T -20° C. | Notched Cherry (kJ/m²) T -40° C. | Flex. Mod. (MPa) | MFI dg/min | φ n µm | φ v µm | Ip | Num. % >1 µm | Vol. % >1 µm |
|---|---|---|---|---|---|---|---|---|---|---|---|---|---|---|
| 29 | W (80% COPO1 + 20% TERPO3) + 80% PA6 | | | | 30 | 22 | 21 | 1420 | 15 | 0.55 | 1.2 | 2.18 | 15 | 65 |
| 30 | W (95% COPO1 + 5% TERPO3) + 80% PA6 | | | | 26 | 15 | 11 | 1512 | 30 | 1.45 | 3.08 | 2.13 | 58 | 98 |
| 31 | W (90% COPO1 + 10% TERPO3) + 80% PA6 | | | | 25 | 20 | 17 | 1474 | 26 | 0.82 | 1.93 | 2.35 | 26 | 85 |
| 32 | W (80% COPO1 + 20% TERPO3) + 80% PA6 | | | | 30 | 22 | 21 | 1420 | 15 | 0.55 | 1.2 | 2.18 | 15 | 65 |
| 33 | 20% F (90% COPO2 + 10% TERPO4) + 80% PA6 | 13 | 6.5 | 4.4 | 24 | 14 | 9.4 | 1258 | 44 | 1.63 | 3.08 | 1.89 | 71 | 99 |
| 34 | 20% F (90% LDPE + 10% TERPO4) + 80% PA6 | 6.7 | 3.6 | 2.9 | 13 | 6.8 | 6 | 1473 | 26 | 1.69 | 3.4 | 2 | 69 | 99 |
| 35 | F (90% COPO1 + 10% TERPO3) + 80% PA6 | | | | 31 | 24 | 19 | 1417 | 24 | 0.44 | 1.02 | 2.21 | 4.1 | 51 |
| 36 | K (90% COPO1 + 10% TERPO3) + 80% PA6 | | | | 31 | 24 | 19 | 1468 | 19 | 0.64 | 1.49 | 2.31 | 15 | 72 |
| 37 | B (90% COPO1 + 10% TERPO3) + 80% PA6 | | | | 30 | 25 | 18 | 1378 | 17 | 0.47 | 1.12 | 2.38 | 8.7 | 62 |
| 38 | W (90% COPO1 + 10% TERPO3) + 80% PA6 | | | | 33 | 26 | 18 | 1310 | 26 | 0.52 | 1.19 | 2.27 | 8.8 | 56 |
| 39 | 90% PA66 + 10% TERPO2 | 17 | 11 | 6 | 29 | 25 | 22 | 1934 | 20 | 0.16 | 0.47 | 2.82 | 0 | 0 |
| 40 | 85% PA66 + 15% TERPO2 | 16 | 14 | 10 | 33 | 30 | 28 | 1678 | 13 | 0.18 | 0.25 | 1.41 | 0 | 0 |
| 41 | 80% PA66 + 20% TERPO2 | NB | 18 | 12 | 35 | 37 | 29 | 1512 | 4.5 | 0.19 | 0.30 | 1.53 | 0 | 0 |
| 42 | 90% PA66 + 10% TERPO3 | 15 | 9 | 7 | 26 | 24 | 22 | 1799 | 41 | 0.37 | 0.58 | 1.58 | 0 | 0 |
| 43 | 85% PA66 + 15% TERPO3 | 17 | 11 | 8 | 28 | 26 | 21 | 1748 | 27 | 0.35 | 0.60 | 1.71 | 0 | 0 |
| 44 | 80% PA66 + 20% TERPO3 | 21 | 12 | 9 | 30 | 26 | 25 | 1460 | 15 | 0.45 | 0.87 | 1.91 | 0 | 0 |
| 45 | 10% F (90% COPO1 + 10% TERPO4) + 90% PA6 | 12 | 9 | 7 | 23 | 20 | 17 | 1727 | 48 | 0.82 | 2.2 | 2.7 | 26 | 89 |
| 46 | 15% F (90% COPO1 + 10% TERPO4) + 85% PA6 | 16 | 10 | 8 | 25 | 22 | 20 | 1476 | 36 | 0.82 | 2.17 | 2.66 | 24 | 89 |
| 47 | 20% F (90% COPO1 + 10% TERPO4) + 80% PA6 | 20 | 13 | 9 | 30 | 25 | 20 | 1271 | 26 | 0.8 | 1.87 | 2.32 | 26 | 86 |

We claim:

1. An impact-resistant injection moulding, comprising polyamide resin (A) and a disperse phase whose particles have a number-average diameter greater than 0.4 µm, a volume-average diameter greater than 1 µm wherein the disperse phase consists of a mixture including at least one copolymer (B) of ethylene and of an unsaturated epoxide and of at least one polyolefin (C), wherein the quantity of epoxide in the copolymer (B) is up to 10% and the proportions of (B) and (C) are such that (C)/(B) is from 95/5 to 80/20.

2. Mouldings according to claim 1, wherein the quantity of disperse phase represents up to 25% by weight of reinforced polyamide resin.

3. Mouldings according to claim 1, wherein the proportions of (B) and (C) are such that (C)/(B) is about 90/10 by weight.

4. Mouldings according to claim 1, wherein the quantity of (B)+(C) is between 10 and 15% by weight of (A)+(B)+(C).

5. Injection mouldings or compositions according to claim 1, wherein (B) is an ethylene/alkyl (meth)acrylate/ unsaturated epoxide copolymer which contains up to 40% by weight of (meth)acrylate and up to 10% by weight of unsaturated epoxide.

6. Injection mouldings or compositions according to claim 1, wherein (B) is an ethylene/alkyl (meth)acrylate/ glycidyl (meth)acrylate copolymer containing 20 to 35% by weight of (meth)acrylate and 0.1 to 8% by weight of glycidyl (meth)acrylate.

7. Injection mouldings or compositions according to claim 5, wherein (C) is an ethylene/alkyl (meth)acrylate copolymer.

8. Method according to claim 2 wherein the dispersed phase is from 10 to 20%.

9. Method according to claim 1, wherein the quantity of epoxide is from 0.1 to 8%.

10. Mouldings according to claim 1 wherein the unsaturated epoxide is selected from aliphatic glycidyl esters and ethers including allyl glycidyl ether, vinyl glycidyl ether, glycidyl maleate and itaconate glycidyl (meth)acrylate, and alicyclic glycidyl esters and ethers including 2-cyclohex-1-ene glycidyl ether, diglycidyl 4,5-cyclohexenecarboxylate, glycidyl 4-cyclohexenecarboxylate, glycidyl 5-norbornene- 2-methyl-2-carboxylate and diglycidyl endocisbicyclo (2.2.1)-5-heptene-2,3-dicarboxylate.

11. Mouldings according to claim 1, wherein the polyamide resin is selected from polyamide 6 (polycaprolactam), polyamide 6,6 (polyhexamethylene adipamide), polyamide 11 (polyaminoundecanoic acid), polyamide 12 (polylauryllactam), and polyamide 6/12, a condensation of caprolactam and of lauryllactam.

* * * * *